Nov. 24, 1970     S. S. SARRA     3,541,786

INBOARD MARINE ENGINE COOLING SYSTEM

Filed April 4, 1969

INVENTOR.
SALVATORE S. SARRA
BY

Attorneys

United States Patent Office 3,541,786
Patented Nov. 24, 1970

3,541,786
INBOARD MARINE ENGINE COOLING SYSTEM
Salvatore S. Sarra, Fond du Lac, Wis., assignor to Brunswick Corporation, Chicago, Ill., a corporation of Delaware
Filed Apr. 4, 1969, Ser. No. 813,623
Int. Cl. F01r 3/04
U.S. Cl. 60—30   3 Claims

ABSTRACT OF THE DISCLOSURE

The engine exhaust pipe leading from the manifold has an elbow turn of approximately 180° initially leading upwardly and thereafter discharging downwardly. The elbow passage for water from the manifold water cooling jacket extends around the exhaust elbow and discharges into the exhaust on the downward side in a manner to prevent draining of water from the manifold and elbow.

---

This invention relates to the cooling system for a marine inboard engine where a portion of the coolant water is discharged into the exhaust.

In constructions heretofore employed the coolant water drained from the exhaust manifold elbow and a portion of the manifold jacket when the engine stopped running.

It has been found that there is a tendency for scale to build up in the various manifold and elbow passages in the former construction, often causing clogging of the passage and water outlet ports. It was reasoned by the present inventor that this might be caused by the fact that a substantial portion of the passage and manifold jacket was frequently drained of water as when the engine was stopped and was subjected to alternate dry and wet periods causing the scale formation.

Following such reasoning the present invention provides an upstanding elbow for the exhaust and for the coolant water whereby the jacket for the elbow and manifold is maintained full of water at all times except when intentionally drained. Thus the air is kept from entering the jacket even when the engine is not running.

The accompanying drawing illustrates the best mode presently contemplated for carrying out the invention.

Figure 1:
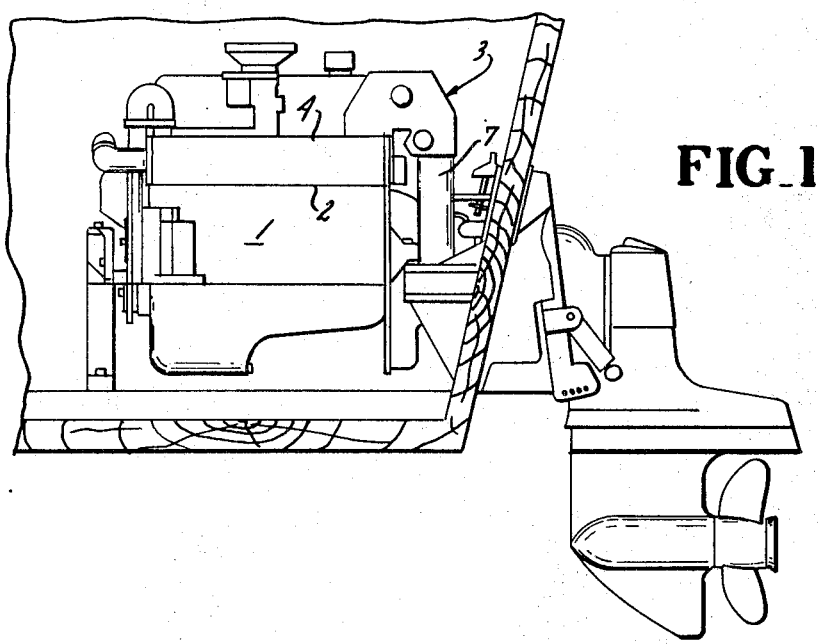
FIG. 1 is a side elevation of an inboard marine engine generally of the four cycle internal combustion engine type.
Figure 2:
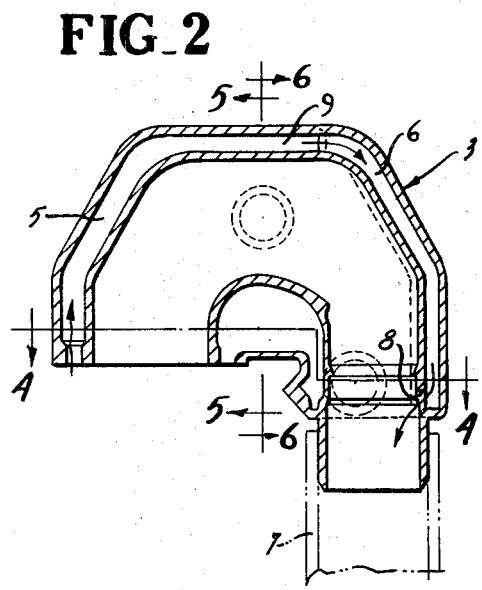
FIG. 2 is a vertical detail section of the exhaust elbow.
Figure 4:
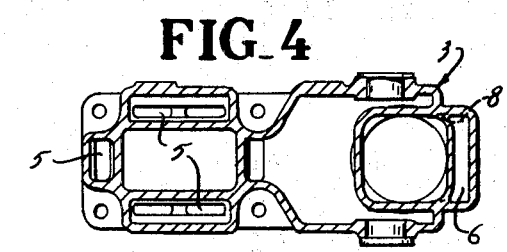
FIG. 4 is a horizontal section taken on line 4—4 of FIG. 2.
Figures 5, 6:
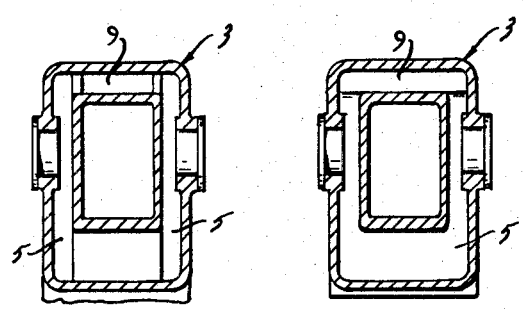
FIG. 5 is a vertical section taken on line 5—5 of FIG. 2 looking to the left.
FIG. 6 is a section on the same line of FIG. 2 and looking to the right.
Figure 3:
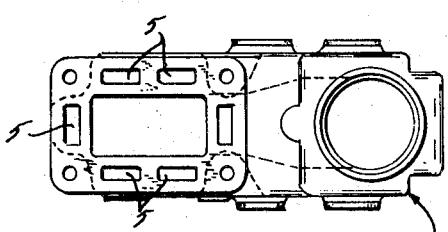
FIG. 3 is a bottom plan view looking upwardly of the elbow shown in FIG. 2.

The marine engine 1 is shown as having an exhaust manifold 2 discharging into a vertical exhaust elbow 3 which turns to a downward direction after rising upwardly from the engine.

A water jacket 4 is disposed in relation to the manifold 2 for cooling the same.

The water from jacket 4 rises in a passage 5 constituting a water jacket over the top of and around elbow 3 and thence passes through outlet passage 6 on the downward side of the elbow and into the downwardly extending exhaust discharge passage or pipe 7 through opening 8. The uppermost surface 9 of the passage 5 forms a weir over which the water must flow to escape into outlet passage 6.

By reason of the construction no part of the engine cooling system or exhaust manifold drains immediately upon stopping of the engine. The elbow establishes a water level so that only outlet passage 6 and the uppermost portion of passage 5 above surface 9 is exposed to alternate dry and wet periods. Since the height of the water in the system is maintained by the weir at the top of outlet passage 6, no restrictions that can be easily clogged need be interposed at opening 8 to keep the system full of water.

I claim:

1. In an inboard marine engine having an exhaust manifold and a water cooling system with a jacket for the manifold, an exhaust elbow leading upwardly from said manifold and thence downwardly to an exhaust discharge passage, and water conduit means communicating with said manifold jacket and constituting a water jacket for said elbow, said elbow jacket having a weir at the top over which water is discharged therefrom and whereby the manifold jacket and most of the elbow jacket are kept full of water when the engine is not running.

2. The construction of claim 1 in which a passage receives the water overflowing said weir and discharges the same into said exhaust discharge passage leading from said elbow.

3. An exhaust elbow for an internal combustion engine having a water jacketed exhaust manifold, said elbow having a water jacket around the same and a weir to keep said exhaust manifold jacket and a substantial portion of said elbow jacket full of water when said engine is not running and for the overflow discharge of water therefrom when the engine is running.

References Cited

UNITED STATES PATENTS

| | | | |
|---|---|---|---|
| 799,013 | 9/1905 | Moffitt | 60—30 |
| 1,478,949 | 12/1923 | Gara | 60—31 |
| 2,708,824 | 5/1955 | Engstrom | 60—30 |
| 3,263,413 | 8/1966 | Vactor | 60—30 |
| 3,283,498 | 11/1966 | Connell | 60—30 |
| 3,485,040 | 12/1969 | Niskanen | 60—31 |

DOUGLAS HART, Primary Examiner

U.S. Cl. X.R.
60—31